United States Patent [19]

Kojima et al.

[11] 4,446,489

[45] May 1, 1984

[54] SIGNAL COPY DEVICE FOR DIGITAL RECORD/REPRODUCTION SYSTEM

[75] Inventors: Tadashi Kojima, Yokosuka; Shigeru Todokoro, Fujisawa, both of Japan

[73] Assignee: Tokyo Shibaura Denki Kabushiki Kaisha, Kawasaki, Japan

[21] Appl. No.: 333,051

[22] Filed: Dec. 21, 1981

[30] Foreign Application Priority Data

Jan. 14, 1981 [JP] Japan ................................. 56-4335

[51] Int. Cl.³ ........................ G11B 27/02; G11B 15/12
[52] U.S. Cl. ....................................... 360/13; 360/61
[58] Field of Search ................... 360/61, 63, 13, 14.1

[56] References Cited

U.S. PATENT DOCUMENTS 4,249,218 2/1981 Davis et al. .......................... 360/13
4,363,049 12/1982 Ohrsuki et al. ....................... 360/13

Primary Examiner—Vincent P. Canney
Attorney, Agent, or Firm—Finnegan, Henderson, Farabow, Garrett & Dunner

[57] ABSTRACT

A signal copy device for a digital record/reproduction system includes an encoding circuit for producing a first digital encoded signal corresponding to an analog audio signal. The encoding circuit is connected to a first VTR through a switch section of a switch circuit and a first digital signal processor. A second VTR reproduces and generates a digital encoded audio signal to be copied. The switch circuit is connected to the encoding circuit and the second VTR. The switch circuit includes two switch sections which operate in cooperation with each other. When a reproduction signal is generated from the second VTR, the two switch sections are switched. The reproduction signal is supplied to the first VTR through these switch sections, thus accomplishing copying.

9 Claims, 2 Drawing Figures

SIGNAL COPY DEVICE FOR DIGITAL RECORD/REPRODUCTION SYSTEM

BACKGROUND OF THE INVENTION

The present invention relates to an improvement in a signal copy device for a digital record and/or reproduction system for copying digital information signals.

With the analog record/reproduction devices such as audio tape recorders, improvements in the S/N ratio, the dynamic range and the frequency characteristics largely depend upon improvements in the performance of the record/reproduction head and the drive mechanism for the recording medium. However, most of the technically feasible improvements in the drive mechanism, that is, elimination of wow fluttering and speed deviation have already been made. Many engineers have asserted that further improvements in the performance of the drive mechanism are unattainable at the present moment. Therefore, great improvements in the characteristics of the analog record/reproduction devices are not expected.

In order to overcome the technical limits of the analog record/reproduction devices, digital record/reproduction systems have recently been developed. With these digital record/reproduction systems, analog data (e.g., audio signals) are sampled, quantized and converted into a digital encoded signals of predetermined bit length. The encoded signals are recorded on a recording medium. By detecting if the respective pulse components of the digital encoded signals are 0 or 1 for reproduction, the waveform of the original analog information signal may be reproduced with high fidelity. In this manner, the reproduction performance such as the S/N ratio, the dynamic range and the frequency characteristics may be easily improved over the conventional systems, independently of the performance of the drive mechanism of the recording medium or the like. This is advantageous in that the signal quality is not degraded and the signal is not lost after repeated copy operations of the information signal.

In a conventional digital record/reproduction system, the output end of an encoding circuit for converting an analog information signal into a digital encoded signal is connected to a first digital signal processing circuit through a switch section. The signal processing circuit serves to add an error correction signal and an error detection signal to the digital encoded information signal. The output end of the first signal processing circuit is connected to a video tape recorder (VTR). The output end of the VTR is connected to the input end of a second digital signal processing circuit through a single connection terminal. The second signal processing circuit serves to correct the error of the information signal. The output end of the second signal processing circuit is connected to the switch section and to a decoding circuit. The switching section performs a switching operation to selectively supply the first signal processing circuit with output signals of the encoding circuit and the second signal processing circuit.

In order to copy to the VTR (first VTR) the digital encoded information signal which is recorded in advance on another VTR, the digital encoded information signal to be transferred must be supplied to the second signal processing circuit. Therefore, with a conventional digital record/reproduction system, for changing from the normal record mode to the copy mode, the output end of the first VTR must be disconnected from the second connection terminal and the output end of the second VTR (storing the information signal to be copied) must be connected to the connection terminal. This is because there is only one connection terminal which is connected to the second signal processing circuit. For this reason, every time the operation mode is changed, the connection of the first and second VTRs to the second signal processing circuit must be changed, resulting in inconvenience.

When the switch section is erroneously operated under the condition that the first VTR is connected between the output end of the first signal processing circuit and the input end of the second signal processing circuit, the output end of the second signal processing circuit and the input end of the first signal processing circuit are directly coupled to each other. When this happens, the first VTR and the first and second digital signal processing circuits form a closed loop. Even if an abnormal signal is generated within this closed loop and is superposed on the normal information signal, the correction of the abnormal signal cannot be performed by the second signal processing circuit. If the upper significant bit of the data constituting the encoded signal changes from logic value "0" to logic value "1" due to the superposition of the abnormal signal, the analog signal obtained by decoding this encoded signal becomes a signal of extremely great amplitude. In the worst case, this may damage other system equipment (e.g, loudspeakers) connected to the output section. Furthermore, the closed loop may cause undesirable oscillation. Consequently, the reliability of the system is vastly degraded.

SUMMARY OF THE INVENTION

It is an object of the present invention to provide a signal copy device for a digital record/reproduction system according to which a switch between the normal record mode and the copy mode may be made with ease, and high reliability may be achieved.

In a signal copy device for a digital record/reproduction system of the present invention, a signal generating means for generating a first digital encoded signal corresponding to an analog information signal is incorporated. A switching means receives the digital encoded signal and a second digital encoded signal to be copied. In the normal record mode, the switching means supplies the first digital encoded signal to a predetermined record/reproduction section, and transmits a digital encoded signal for monitoring from the signal record/reproduction section to the decoding means. The decoding means decodes the digital encoded signal for monitoring and converts it into the analog information signal. On the other hand, in the copy mode, the switching means supplies the second digital encoded signal to be transmitted to the signal record/reproduction section. This switching means includes at least two switches which operate in cooperation with each other.

DETAILED DESCRIPTION OF THE PREFERRED EMBODIMENTS

Figure 1:
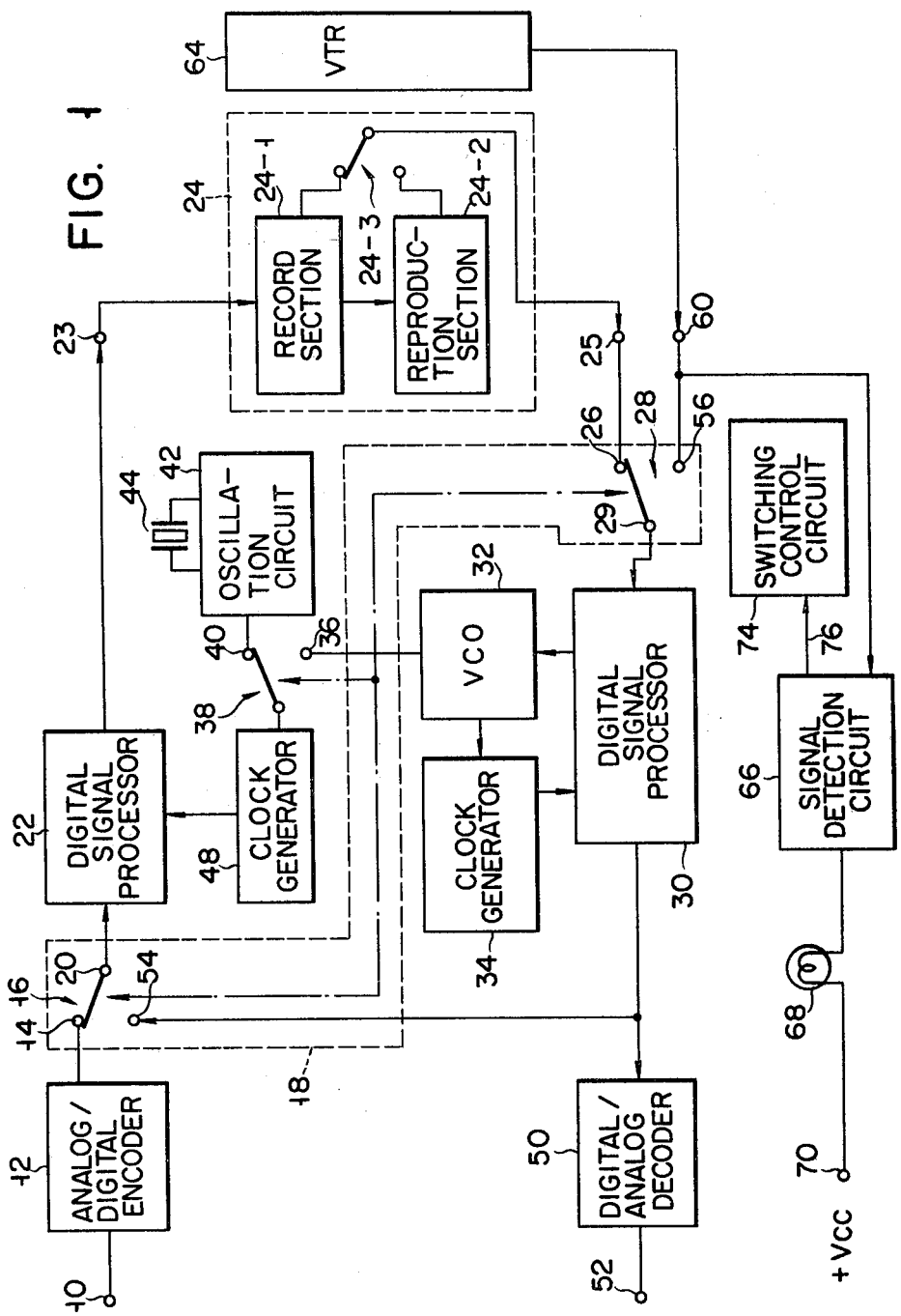
FIG. 1 is a block diagram showing the configuration of a signal copy device for a digital record/reproduction system according to an embodiment of the present invention.

FIG. 1 shows the digital record and/or reproduction system according to one embodiment of the present invention. Reference numeral 10 denotes a terminal to which an analog information signal such as an audio signal is supplied. This signal input terminal 10 is connected through a known analog/digital encoder (A/D encoder) 12 to one input terminal 14 of a switch section such as a double throw switch 16 in a switch circuit 18. The audio signal transmitted from the signal input terminal 10 to the A/D encoder 12 is sampled, quantized, and converted into a digital signal in the A/D encoder 12. An output terminal 20 of the switch 16 is connected to the input end of a first digital signal processor 22. The first digital signal processor 22 serves to add to the digital encoded audio signal a predetermined error correction signal and an error detection signal. The output end of the circuit 22 is connected to the input end of a record/reproduction section 24 through a connection terminal 23. A video tape recorder of known construction may be used for this record/reproduction section 24. This video tape recorder 24 (to be referred to as a VTR for brevity hereinafter) comprises, for example, a record section 24-1, a reproduction section 24-2 which reproduces the signal recorded in the record section 24-1, and a switch 24-3 connected to the output ends of these sections 24-1 and 24-2. During signal recording, the record section 24-1 records on a recording medium (not shown) a TV signal on which is superposed a PCM audio signal (to be referred to as a digital encoded audio signal hereinafter) which is supplied from the processor 22. The record section 24-1 also outputs a video signal for monitoring which corresponds to this recorded signal. The recorded signal is output from the VTR 24 through the switch 24-3. On the other hand, during signal reproduction, the switch 24-3 is switched and the digital encoded audio signal which is recorded on the recording medium (not shown) by the record section 24-1 is reproduced by the reproduction section 24-2. The reproduced signal is output from the VTR 24 through the switch 24-3 which is switched. The output end of the VTR 24 is connected through a connection terminal 25 to one input terminal 26 of another double throw switch 28. The switch 28 is included in the switch circuit 18. The VTR 24 is detachably connected to the terminals 23 and 25. In the case of the embodiment of the present invention, the switch circuit 18 comprises two double throw switches 16 and 28. These switches 16 and 28 are so constructed as to operate in cooperation with each other by a known means, such as a magnetic means. An output terminal 29 of the double throw switch 28 is connected to the input end of a second digital signal processor 30. The second digital signal processor 30 is connected to a voltage-controlled oscillator (to be referred to as a VCO for brevity hereinafter) 32 and a known clock generator 34. The second digital signal processor 30 separates a synchronous signal from the digital encoded audio signal which is transmitted from the VTR 24 through the double throw switch 28. According to this synchronous signal, the VCO 32 generates an original oscillation signal which is necessary for reproduction. This original oscillation signal is generated by a phase locked loop (PLL) (not shown). The digital encoded audio signal from which the synchronous signal is separated is subjected to separation of data by the second digital signal processor 30, for carrying out error detection and error correction.

The VCO 32 is connected to one input terminal 36 of another double throw switch 38. The other input terminal 40 of this switch 38 is connected to a known oscillation circuit 42 which has a quartz ocillator 44. The double throw switch 38 operates in cooperation with the two double throw switches 16 and 28 and is switched in response to the switching operation of these switches 16 and 28. The output end of the switch 38 is connected to the first digital signal processor 22 through another clock generator 48.

The output end of the second digital signal processor 30 is connected to an output terminal 52 through an analog/digital decoder (to be referred to as an A/D decoder for brevity hereinafter) 50 as well as to another input terminal 54 of the double throw switch 16 of the switch circuit 18. The A/D decoder 50 demodulates the output signal from the second digital signal processor 30, that is, the digital encoded audio signal, and converts it into the original analog audio signal. The analog audio signal thus obtained is supplied to an audio signal amplifier and a loudspeaker (not shown) through the output terminal 52.

The other input terminal 56 of the double throw switch 28 of the switch circuit 18 is connected to a connection terminal 60, which is, in turn, connected to another record/reproduction section, for example, a VTR 64. This VTR (second VTR) 64 stores the information signal which is to be copied to the VTR (first VTR) 24, that is, the digital encoded audio signal. The input terminal 56 of the switch 28 is further connected to the input end of a signal detection circuit 66. The output end of the signal detection circuit 66 is connected through an informing part such as an indicator lamp 68 to a power source terminal 70 which is supplied with a power source voltage $+V_{CC}$. The signal detection circuit 66 detects the reproduction signal transmitted from the second VTR 64 and drives the indicator lamp 68. When the reproduction signal, that is, the digital encoded audio signal is output from the second VTR 64, the signal detection circuit 66 detects the reproduction signal and supplies power to the indicator lamp 68. The indicator lamp 68 is then lit.

The signal detection circuit 66 is further connected to a switching control circuit 74. The switching control circuit 74 operates in response to a detection signal 76 generated from the signal detection circuit 66 to cause the switch 28 shorted to the input terminal 26 side in the ordinary state to be thrown on the other terminal 56 side by, for example, magnetic attraction. As has been described hereinbefore, the switch 16 included in the switch circuit 18 and the switch 38 connected to the clock generator 48 are switched in synchronism with the switching operation of this switch 28.

The operation mode of the digital record/reproduction system with the signal copy device according to one embodiment of the present invention of the construction described above will now be described.

When signal copy is not performed, that is, in the normal record mode, the second VTR 64 does not produce any output. Therefore, the signal detection circuit 66 does not generate an output either. In this state, the movable contact of the double throw switch 28 of the switch circuit 18 is short-circuited to the side of the input terminal 26 by the switching control circuit 74, as shown in the figure. Then, in cooperation with the switch 28, the switch 16 of the switch circuit 18 is switched to the side of the input terminal 14, as shown in the figure. Simultaneously, the double throw switch 38 which is connected to the clock generator 48 is also switched to the side of the input terminal 40 in synchronism with the switching operation of the switch 28. By the switching operation of these switches 16, 28 and 38, the analog/digital encoder 12 is connected to the first digital signal processor 22, the first VTR 24 is connected to the second digital signal processor 30, and the oscillation circuit 42 is connected to the clock generator 48. Under this condition, the analog signal (analog information signal) which is supplied to the signal input terminal 10 is sampled, quantized and converted into the digital encoded signal at a predetermined frequency at the analog/digital encoder 12. The output signal from the encoder 12 is transmitted to the first digital signal processor 22 through the double throw switch 16. To the output signal from the encoder 12 are added by the first digital signal processor 22 the predetermined error correction signal and the error detection signal. According to the oscillation signal transmitted from the oscillation circuit 42 with the quartz oscillator 44 through the switch 38, the first digital signal processor 22 performs the operation as described above in synchronism with the clock signal generated by the clock generator 48.

The TV signal including the PCM audio signal which is produced from the first digital signal processor 22 is input to the first VTR 24. The first VTR 24 records the signal on a recording medium such as magnetic tape (not shown) by known means, and outputs the digital encoded audio signal for monitoring from its output end. The output signal from the first VTR 24 is transmitted to the second digital signal processor 30 through the other switch 28 of the two double throw switches 16 and 28 constituting the switch circuit 18. The second digital signal processor 30 separates the synchronous signal from the digital encoded audio signal from the first VTR 24. The original oscillation signal which is necessary for the reproduction is generated at the VCO 32 by the known PLL, which is not shown. After the synchronous signal is separated from the digital encoded audio signal, the audio signal is subjected to data separation by the second digital signal processor 30 for error detection and error correction. The output signal from the second digital signal processor 30 is transmitted to the decoder 50 alone. This is because the double throw switch 16 of the switch circuit 18 is switched to the side of the input terminal 14. The digital encoded audio signal transmitted from the second digital signal processor 30 is demodulated by the decoder 50 and converted into the original analog audio signal. The analog audio signal is transmitted to an audio amplifier or a loudspeaker (not shown) through the output terminal 52 for monitoring. In this manner, the operator can monitor, while recording, the audio information which is being recorded.

For reproducing the audio information signal recorded in the first VTR 24, the first VTR 24 is set in the reproduction mode. In this case, the audio signal stored in the first VTR 24 is transmitted to the second digital signal processor 30 through the double throw switch 28. The subsequent operations are the same as described above. The output signal from the second digital signal processor 30 is demodulated by the decoder 50 and is monitored by the operator.

In the embodiment described above, the signal is not supplied to the connection terminal, and the signal detection circuit 66 detects no signal. Therefore, the indicator lamp 68 is not connected and goes off.

The mode of operation of the digital record/reproduction system will now be described for copying desired audio information, for example, for copying in the first VTR 24 the recording signal stored in the second VTR 64.

The recording medium (not shown) on which the audio information is recorded is set in the second VTR 64. When the second VTR 64 is placed in the reproduction mode, the digital encoded signal to be copied is supplied to one switch 28 of the switch circuit 18. Then, the signal detection circuit 66 detects the signal to be copied and outputs the predetermined detection signal 76. When the detection signal 76 is supplied to the switching control circuit 74, the switching control circuit 74 switches the switch 28 to the side of the other input terminal 56. Then, the other switch 16 of the switch circuit 18 is also switched to the side of the other input terminal 54 in synchronism with the switch 28. Simultaneously, the switch 38 connected to the clock generator 48 is also switched to the side of the other input terminal 36 in synchronism with the switching operation of the switch 16. By the switching operation of the double throw switch 28, the output end of the first VTR 24 is electrically disconnected from the input end of the second digital signal processor 30. The output end of the second VTR 24 for reproducing the information signal to be copied is connected to the input end of the second digital signal processor 30. By the switching operation of the other switch 16 of the switch circuit 18, the encoder 12 is electrically disconnected from the first digital signal processor 22, and the output end of the second digital signal processor 30 is connected to the input end of the first digital signal processor 22. By the switching operation of the switch 38, the oscillation circuit 42 is disconnected from the clock generator 48, and the VCO 32 is connected to the clock generator 48 instead. When the second VTR 64 is placed in the reproduction mode under this condition, the information signal (i.e., the digital encoded audio signal) to be copied is transmitted to the second digital signal processor 30 through the connection terminal 60 and the switch 28. Then, the signal detection circuit 66 detects this signal, and supplies the detection signal to the indicator lamp 68. Since the indicator lamp 68 is then lit, the operator may confirm that the record/reproduction system is performing the copying operation.

The digital encoded audio signal to be copied which is input to the second digital signal processor 30 is subjected to separation of the synchronous signal, error detection and error correction by the second digital signal processor 30 as has been described hereinabove. According to the synchronous signal, the VCO 32 generates the original oscillation signal as has been described above. The original oscillation signal is transmitted to the clock generator 48 through the switch 38. This original oscillation signal is converted into a predetermined clock signal by the clock generator 48 and is then supplied to the first digital signal processor 22. As has been described hereinabove, the first digital signal processor 22 operates in synchronism with the clock signal supplied from the clock generator 48.

The output signal (the digital encoded audio signal) from the second digital processor 30 is supplied to the decoder 50 so that the operator may monitor the audio information to be copied as has been described above. The output signal from the second digital signal processor 30 is also transmitted to the first digital signal processor 22 through the double throw switch 16 of the switch circuit 18. After the error detection signal and the error correction signal are added to the signal to be copied by the first digital signal processor 22, the signal is transmitted to the input end of the first VTR 24. Since the first VTR 24 is set in the record mode in this case, the signal is recorded in the first VTR 24. In this manner, the signal to be copied from the second VTR 64 can be copied in the first VTR 24.

With the signal copy device for the digital record/reproduction system according to the embodiment of the present invention of the construction and mode of operation as described above, the two VTRs 24 and 64 are selectively connected to the second digital signal processor 30 through the switch 28. The switch 28 is switched by the swithing control circuit 74 according to the normal record mode and the copy mode. The other switch 16 of the switch circuit 18 is switched in synchronism with the switching operation of the switch 28. In the copy mode, the switch 28 is switched and the signal to be copied is supplied the second digital signal processor 30 from the second VTR 64. Then, the switch 16 is switched to the side of the terminal 54. Then, the output end of the second digital signal processor 30 is connected to the input end of the first digital signal processor 22. Therefore, the information signal to be copied which is output from the second VTR 64 and which is transmitted through the switch 28 and the second digital signal processor 30 is supplied to the first VTR 24 through the switch 16 and the first digital signal processor 22. When copying is complete, the switches 16 and 28 are switched and are restored to the initial condition. During this time period, the first and second VTRs 24 and 64 may remain connected to the switch section 28. Therefore, it is not necessary to change the connection of the first and second VTRs 24 and 64 according to the operation mode. The switching between the normal record mode and the copy mode may be performed with ease and at high speed.

The switches 16 and 28 are so constructed as to be switched in synchronism with each other according to the operation mode. For example, when the mode changes from the copy mode to the normal record mode (the input and output ends of the first VTR 24 are connected to the connection terminals 23 and 25), the switch 28 is switched to the side of the input terminal 26, and the output end of the first VTR 24 is connected to the second digital signal processor 30 through the switch 28. At this time, the switch 16 is switched to the side of the input terminal 14 in synchronism with the switch 28. Therefore, the output end of the second digital signal processor 30 is separated from the input end of the first digital signal processor 22. In this manner, the formation of the closed loop of the first and second digital signal processors 22 and 30 and the first VTR 24 is prevented without failure. When these circuit components 22, 24 and 30 are connected to form a closed loop, the information signal is trapped within this closed loop. When an undesirable abnormal signal is generated by one of these circuit components 22, 24 and 30 and is mixed in the normal digital encoded audio signal, the second digital signal processor 30 cannot perform the error correction regardless of reception of the error detection signal corresponding to the abnormal signal. As a result of this, in the worst case, the data of the upper significant bit of the digital encoded signal changes. When this happens, the signal becomes a signal of extremely great amplitude and may damage the output device. However, according to the present invention, since the formation of the closed loop may be prevented without failure, the reliability of the system may be improved.

The switch 38 connected to the clock generator 48 is also constructed to be switched in synchronism with the switch 28 included in the switch circuit 18. For changing from the copy mode to the normal record mode, when the switch 28 is switched to the side of the input terminal 26, the switch 38 connected to the clock generator 48 is also switched to the side of the input terminal 40 in synchronism with this switching operation. Thus, the VCO 32 is separated from the clock generator 48. In this manner, the formation of the closed loop of the first digital signal processor 22, the first VTR 24, the second digital signal processor 30, the VCO 32 and the clock generator 48 is prevented. When these circuit components 22, 24, 30, 32 and 48 are connected to form a closed loop, oscillation is caused. This results in greater possibility of erratic operation of the digital record/reproduction system. However, according to the present invention, such an oscillation condition may be prevented. The reliability of the system may be further improved in this manner.

Further, according to the present invention, during the period for copying in the first VTR 24 the digital encoded information stored in the second VTR 64 is the indicator lamp 68 lit. Therefore, the operator may easily discriminate between the copy mode and the normal record mode.

Figure 2:
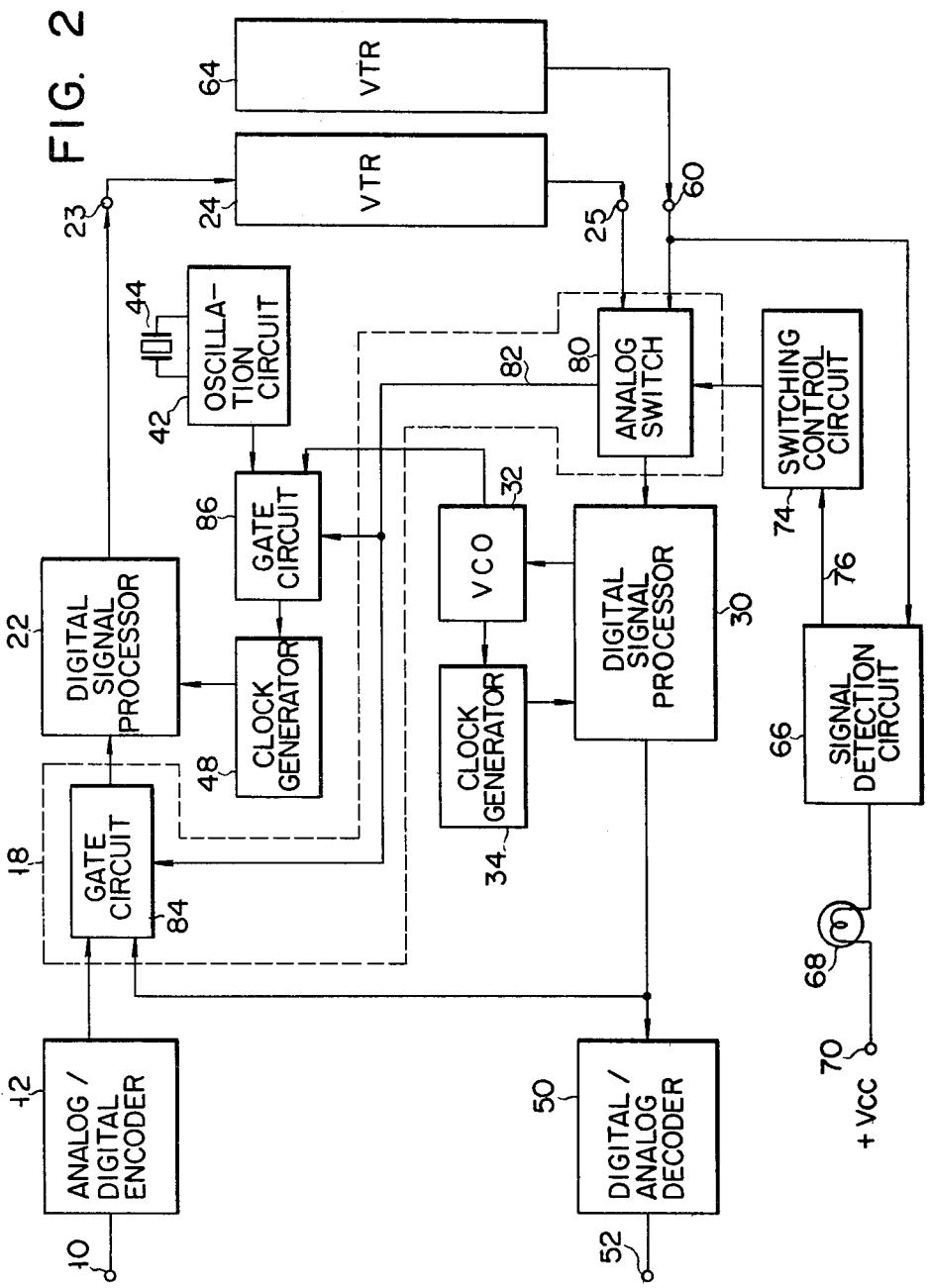
FIG. 2 is a block diagram showing the configuration of a signal copy device for a digital record/reproduction system according to another embodiment of the present invention.

FIG. 2 shows a signal copy device for a digital record/reproduction system according to another embodiment of the present invention. Referring to FIG. 2, the same reference numerals denote the same parts, as in the first embodiment as shown in FIG. 1, and the description thereof is omitted. The switch circuit 18 includes an analog switch 80. The connection terminal 25 to which is detachably connected the first VTR 24 and the connection terminal 60 to which is detachably connected the second VTR 64 are connected to the input end of the analog switch 80. This analog switch 80 switches according to the control operation of the switching control circuit 74. In the normal record mode, the output signal from the first VTR 24 is supplied to the second digital signal processor 30. When the signal to be copied (digital encoded audio signal) is transmitted from the second VTR 64 (in the copy mode), the detection signal 76 is generated from the signal detection circuit 66 as mentioned above. In response to the detection signal 76, the switching control circuit 74 controls the analog switch 80. Then, the analog switch 80 switches so that the signal from the second VTR 64 is supplied to the second digital signal processor 30. In synchronism with the switching operation in the copy mode, the analog switch 80 generates a switch signal 82. The switch signal 82 is transmitted to a gate circuit 84 which is included in the switch circuit 18. The gate circuit 84 is formed of, for example, AND networks and OR networks. The input ends of the gate circuit 84 are connected to the encoder 12 and the second digital signal processor 30, respectively. The output end of the gate circuit 84 is connected to the first digital signal processor 22. The gate circuit 84 is switched in response to the switch signal 82 which is transmitted from the analog switch 80 in the copy mode. Then, the encoder 12 is separated from the first digital signal processor 22, and the output signal from the second digital processor 30 alone is allowed to pass through the gate circuit 84. The signal transmitted through the gate circuit 84 is supplied to the first VTR 24 through the first digital signal processor 22. In this manner, the information signal to be copied and to be reproduced by the second VTR 64 is copied in the first VTR 24.

The switch signal 82 is generated from the analog switch 80 included in the switch circuit 18 and is also supplied to a gate circuit 86 which is connected to the clock generator 48. In response to the switch signal 82, the gate circuit 86 selectively supplies to the clock generator 48 the oscillation signal from the oscillation circuit 42 and the original oscillation signal from the VCO 32.

According to this embodiment of the present invention, the switch circuit 18 includes the analog switch 80 and the gate circuit 84 which are electronic circuits. Accordingly, the reliability of the switching operation is improved and the switching speed is also improved over mechanical switching mechanisms.

Although the present invention has been shown and described with respect to particular embodiments, nevertheless, various changes and modifications which are obvious to a person skilled in the art to which the invention pertains are deemed to lie within the spirit, scope, and contemplation of the invention. For example, a video tape recorder (VTR) is used for recording and reproducing the information signal which is encoded into the digital signal in the above embodiments. However, the present invention is not limited to this. For example, this may be performed with a video disk or the like.

What we claim is:

1. A signal record and copy device for a digital record/reproduction system having a record section and a reproduction section comprising:
   encoding means for receiving analog signals to be recorded and converting them to first digital encoded signals corresponding thereto;
   decoding means for receiving digital encoded signals and decoding them to produce analog signals corresponding thereto;
   at least one signal reproducing section from which recorded second digital encoded signals can be reproduced for copying;
   switching means selectively actuable to enable the device to operate in a record mode or a copy mode, the switching means being connected to receive the first and second digital encoded signals and, when actuated to the record mode, to supply the first digital encoded signals to the record section for recording, when actuated to the copy mode, to supply the second digital encoded signals to the record section for copying by recording them;
   said switching means including a first switch section operable in the copy mode to connect the at least one signal reproducing section to the record section to record the second digital encoded signals and to connect the record section to the decoding means to provide analog monitoring signals corresponding to the recorded second digital encoded signals being recorded, and a second switch section connected to said first switched section and said encoding means and operative in cooperation with said first switched section in the record mode to supply the first digital encoded signals through said first switch section to the record section and to connect the record section to the decode means to provide analog monitoring signals corresponding to the second digital encoded signals being recorded.

2. A signal record and copy device according to claim 1, wherein said at least one signal reproducing section is selectively connectible to said first switch section whereby, when the second digital encoded signals recorded in said signal reproducing section are to be copied in said signal record section, said first switch section performs a switching operation to complete the connection to pass the second digital encoded signal, and said second switch section is switched in synchronism with said first switch section switching operation to supply the second digital encoded signals to said signal record section.

3. A signal copy device according to claim 2, wherein, when copying of the second digital encoded signals recorded in said signal reproducing section is completed, said first switch section is switched again to substantially insulate said signal reproducing section and said second switch section is switched again in cooperation with said first switch section to supply to said signal record only the first digital encoded signals generated by said encoding means.

4. A signal copy device according to claim 2, further comprising:
   detecting means for detecting the second digital encoded signals generated from said signal reproducing section to generate a predetermined detection signal;
   controlling means connected to said detecting means to receive said detection signal for controlling a switching operation of said first switch section in response thereto; and
   informing means connected to said detecting means to receive said detection signal and to operate in response thereto for informing a user that second digital encoded signals are being supplied to said first switch section.

5. A signal copy device according to claim 4, wherein said informing means includes light-emitting means which emits visible light in response to said detection signal.

6. A signal copy device according to claim 1, further comprising:
   first circuit means connected between said second switch section of said switching means and said signal record section for adding at least an error correction signal and an error detection signal to the first and second digital encoded signals which are selectively passed by said second switch section; and
   second circuit means connected between said first and second switch sections for subjecting the digital encoded signals to at least error detection and error correction in response to said error detection signal and said error correction signal which are added to the second digital encoded signals generated from said first switch section.

7. A digital record/reproduction system comprising:
   encoding circuit means for receiving an analog information signal and for converting the analog information signal to produce a first digital encoded signal;
   reproducing means for reproducing a second digital encoded signal to be copied, the second digital encoded signal being recorded in advance;

recording means for recording predetermined digital encoded signals and for generating a monitor signal corresponding thereto;

decoding circuit means for receiving and decoding digital encoded signals; and switching means including at least two switch sections which operate in cooperation with each other for supplying the first digital encoded signal to said recording means and for supplying the monitor signal generated by said recording means to said decoding circuit means in a first operation mode, and for supplying the second digital encoded signal to said recording means in a second operation mode, said switching means including a first switch section which is connected to said reproducing means and said recording means and selectively transmits the second digital encoded signal from said reproducing means and the monitor signal from said recording means, and a second switch section which operated in cooperation with said first switch section connected to said first switch section and said encoding circuit means and selectively supplies to said recording means an output signal transmitted by said first switch section and the first digital encoded signal produced by said encoding circuit means.

8. A digital record/reproduction system according to claim 7, wherein said first switch section of said switching means selectively supplies the second digital encoded signal and said monitor signal to both said second switch section and said decoding circuit means.

9. A digital record/reproduction system according to claim 8, wherein said recording means and said reproducing means are respectively included in video tape recorders which are detachably connected to said switching means.

* * * * *